Nov. 8, 1932.  C. G. MORTIMER  1,887,211
BLOCK HANDLING DEVICE
Filed Feb. 20, 1931  3 Sheets-Sheet 1

Inventor
CHARLES G. MORTIMER,
By  J. C. Bierman
Attorney

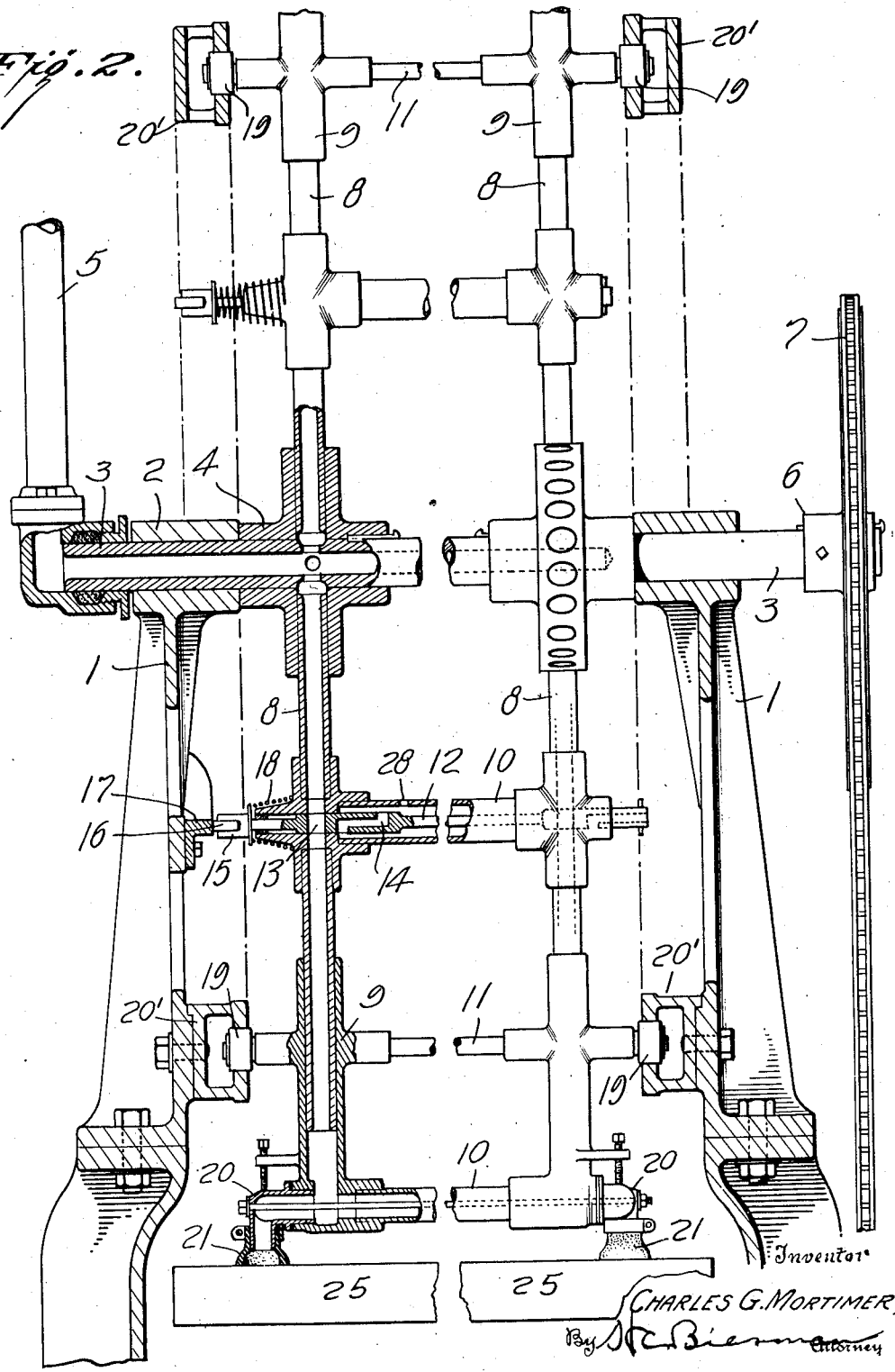

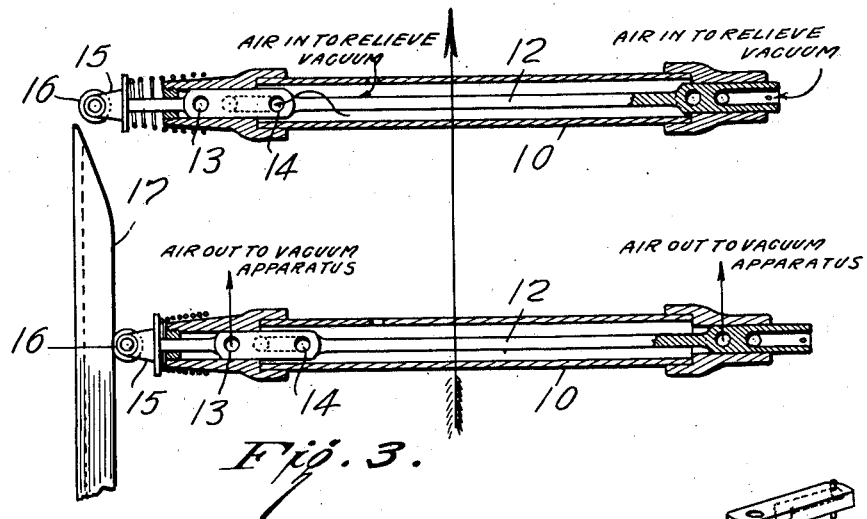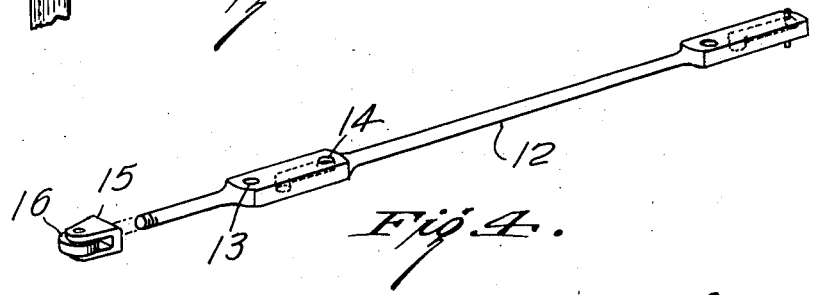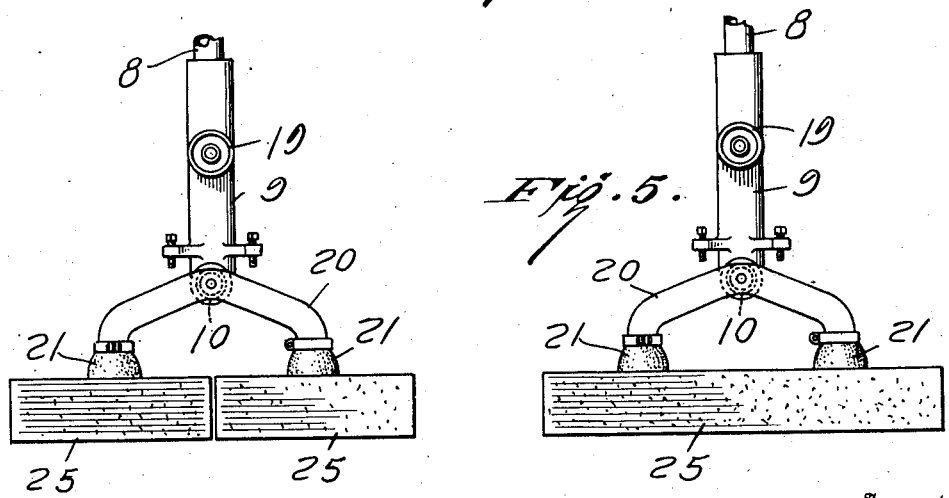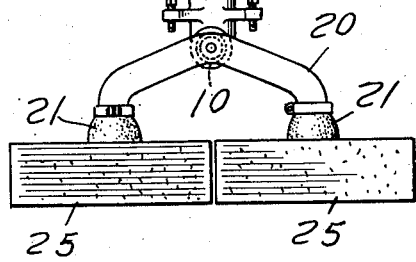

Patented Nov. 8, 1932

1,887,211

UNITED STATES PATENT OFFICE

CHARLES G. MORTIMER, OF GLEN RIDGE, NEW JERSEY, ASSIGNOR TO STRUCTURAL GYPSUM CORPORATION, OF LINDEN, NEW JERSEY, A CORPORATION OF DELAWARE

BLOCK HANDLING DEVICE

Application filed February 20, 1931. Serial No. 517,164.

My present invention relates to a handling machine for picking up articles from one conveyer or location and depositing them upon another conveyer or at another location.

The principal object of the invention is the provision of a device for handling articles having a substantially plane surface of which precast slabs or tiles of gypsum are but an example.

In automatic casting machines for gypsum blocks or tiles, the cast articles are ordinarily taken from the series of endless molds in which the blocks are cast by manual labor, and placed upon conveyers for transportation to the drying kilns or storage yards. This not only necessitates strenuous physical labor, but requires close attention on the part of the operator and is subject to the many irregularities accompanying human operations.

It is an important object of the invention, therefore, to provide a handling machine for precast slabs or tiles of gypsum or the like, which will automatically, continuously and uniformly pick up such precast products from a continuous block casting machine or conveyer and deposit the same efficiently and without breakage upon a second conveyer or carrier for transportation to any desired location, such as the drying kiln, storage yards or warehouse.

One aspect of the invention contemplates the provision of a rotary carrier positioned near the take-off end of a conveyer or casting machine and adapted to pick up articles or slabs from the end of the first conveyer and deposit them upon the end of a second conveyer. This rotary carrier may conveniently consist of hollow telescopic arms radially arranged about a hollow central hub, the hub being suitably mounted for rotation in a frame. The arms may comprise a stationary portion and a movable portion telescopically engaging the former, the latter carrying at its end a hollow yoke hingedly connected thereto, with pick-up cups, preferably flexible, secured to each end of the yoke.

Fixedly secured to the frame is a camway in which rides a cam element carried by a movable portion of the telescopic arms, and upon rotation of the carrier the camway causes extension and retraction of the movable portion of the telescopic arm, for a purpose to be more fully described hereinafter.

Also carried by the frame is a cam engagable by a cam element carried by a slide valve, the slide valve operating laterally of the telescopic arms. The hub of the carrier, the arms, the yoke and the pick-up cups being hollow, a vacuum may be established in the pick-up cups by connecting the hollow hub to a vacuum producing means. The slide valve in the arms is adapted, upon being moved under action of the cam or a spring, to permit the establishment or release of a vacuum in the pick-up cups respectively.

In the operation of such a device, the rotary carrier is so positioned with respect to the end of an initial carrier or molding machine that the pick-up cups at the end of the arms will move in a direction and at the speed of the articles on the conveyer or carrier. As the articles, for instance, precast slabs, pass beneath the carrier, the pick-up cups contact with the top thereof and under action of the camway and the arm cam, the movable portion of the arm is forced downwardly slightly against the surface of the slab to establish firm contact between the slab and the pick-up cup. At this point, the slide valve has been moved under action of its cam so that a vacuum may be established in the cup, whereupon the slab is picked up from the conveyer and moved outwardly therefrom away from the same. Due to the path of the camway, the pick-up cups are made to move out of a normal rotary or circular path into one in substantially a straight line. This is permitted due to the telescopic nature of the arms. This substantially straight line path brings the slab over the end of the second conveyer, whereupon under action of the spring the slide valve is operated to relieve the vacuum in the pick-up cups and the slab is thereupon gently deposited upon the conveyer for transportation to any desired location. This operation may be continued automatically and without attention.

The invention further consists of the novel details of construction, combination and arrangement of parts more fully hereinafter described and shown in the accompanying drawings.

In the drawings—

Fig. 2 is a front elevation partly in section of the device of Fig. 1.

Fig. 3 is a detail showing the operation of the slide valve.

Fig. 4 is a perspective view of the slide valve.

Fig. 5 is a fragmentary view showing the method of engagement of the pick-up cups with a single article.

Fig. 6 is a view similar to Fig. 5, showing the pick-up cups in the act of lifting two articles simultaneously.

Figure 1:
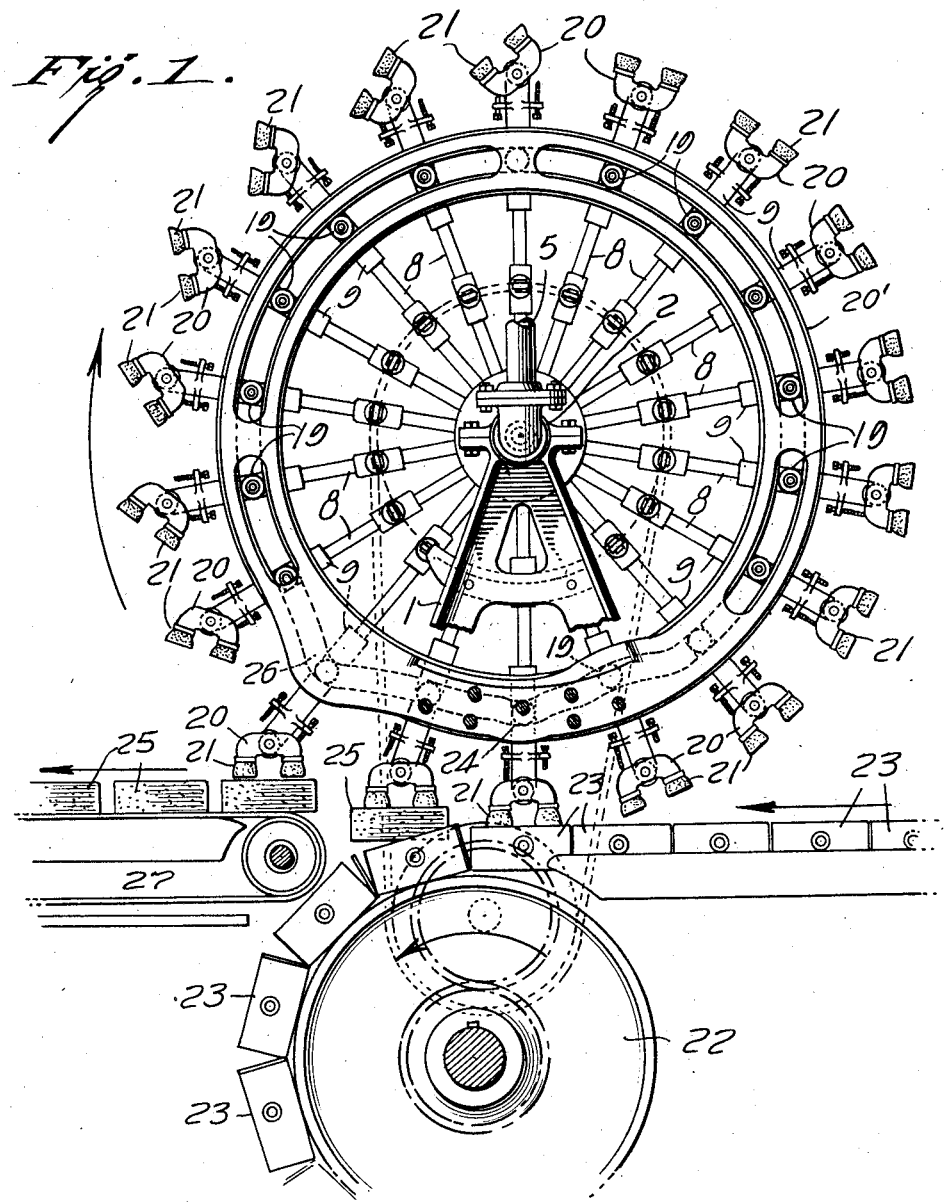
Fig. 1 is a side elevation of one embodiment of the invention, showing its relation to two conveyers.

Referring now with particularity to the embodiment illustrated, I have shown at 1 a frame having a bearing 2, in which is supported the trunnion 3 of a hollow hub 4 for rotary movement. One end of the trunnion 3 is connected with a pipe 5 connected to a suitable means for producing a vacuum or lowered pressure. The opposite end of the trunnion 3 is connected with a gear 6 driven by a chain 7 from any suitable source of power.

The hollow hub 4 carries therein radial arms consisting of a stationary portion 8 and a movable portion 9 telescopically engaging the former. As shown, it has been found desirable to provide two series of these radial arms spaced apart laterally and suitably braced as by a pipe 10 and rod 11.

Mounted within the pipe 10 is a slide valve 12 movable laterally of the arms 8 and forming a close connection therewith. An aperture 13 in the slide valve is adapted under certain conditions to be aligned with the bore in the telescopic arms. The slide valve 12 is also provided with a passage 14 which may also establish a connection between the bore of the telescopic arms and the outside air, all of which will be more fully described hereinafter.

The slide valve 12 is provided at one end with a fitting 15 carrying a roller 16 engageable with a cam 17 fixedly secured to the frame 1. A coil spring 18 engages the fixture 15 at one end and the telescopic arm at the other end so as to normally tend to move the slide valve to the left, (Figs. 2 and 3) and to establish connection between the inside of the pipe 10 and the lower portion of the bore of the telescopic arm 8. Under action of the cam 17, however, the roller 16 forces the slide valve 12 into the position shown in Fig. 1, thus establishing a connection between the vacuum producing means attached to the pipe 5 and the telescopic arm.

Suitably secured to the telescopic portion 9 of the radial arms is a cam element or roller 19 riding in a camway 20' also carried by the frame 1. This camway as shown in Fig. 1, has an irregular path which, when the entire device is rotated, causes the telescopic arms to be extended or retracted as the roller 19 occupies various positions in the camway.

At the extreme ends of the telescopic arms there are carried pivoted yokes 20 which are hollow and which have secured at the ends thereof rubber pick-up cups 21. As shown, this construction is duplicated on each series of radial arms so that in the normal operation of the machine each article is adapted to be engaged by four cups.

Such a handling machine may conveniently be used in connection with two conveyors as shown in Fig. 1, and there is shown generally at 22 a block or tile casting machine of the continuous type in which the individual molds are filled with plastic material such as gypsum or the like and upon solidification are adapted to be removed from their molds. This removal is ordinarily done by manual labor. The individual molds are shown at 23, the details of which are not necessary for an understanding of the present invention. It is contemplated, however, that the horizontal speed of travel of the molds and the blocks to be handled will be the same as that of the pick-up cups so that as the cups come in contact with the articles or slabs, there will be no relative movement between them during the time that the slab is actually transported by the conveyor or the molding machine.

In the operation of the combination shown in Fig. 1, the carrier being suitably rotated and the casting machine 22 moving in the direction indicated, as the yokes and their pick-up cups approach the slabs, the cam roller 19 upon an arm will ride into that portion of the camway indicated at 24 which gives a slight downward movement to the extensible arm and forces the pick-up cups 21 into close engagement with the top of the slab. Just prior to the engagement of the cups with the top of the slabs, the cam roller 16 on the slide valve has come into engagement with the cam 17. This forces the slide valve to the right (Fig. 2) and establishes a connection between the vacuum cup 21 and the pipe 5, with the consequent lowering of the pressure in the former. Upon engagement, therefore, between the pick-up cups 21 and the slab 25 at that point, the slab contained within its individual mold 23 will be securely gripped by the pick-up cups and upon further rotation of the carrier the slab will be lifted from its mold or from the conveyor and moved with the carrier arms. During the next portion of the arm movement, the roller 19 rides in the irregular portion of the camway 20' indicated at 26. This causes the normal circular or rotary movement of the pick-up cups and associated mechanism to be changed and at this point to travel in substantially a straight line path. This is necessary as the slab must be moved from the end of the conveyer 22 to the end of the conveyer 27. This straight line movement is possible due to the telescopic nature of the radial arms. When the slab 25 has reached a position in proximity to the end of the conveyer 27, the carrier is so timed that the roller 15 at the end of the slide valve rides off of its cam 17. The slide valve under the action of the spring 18 moves to the left (Fig. 2) and permits the bottom portion of the passage 14 to align itself with the bore of the lower portion of the radial arm. In this position, air enters through the port 28 of the upper pipe 10, passing through the passageway 14 and into the radial arm to relieve the vacuum in the pick-up cup 21. As a consequence, the block 25 is gently deposited upon the conveyer 27. From this point telescopic arm is retracted to its initial position under the action of its cam roller 19 and camway 20, and the operation is repeated.

It will be apparent in this connection that the yoke 20 may be so located with respect to the articles being handled that a single article may be picked up as in Fig. 5, or two articles at once as in Fig. 6, the separation of the arms of the yoke being a matter to be determined by the circumstances of operation and the type of articles handled.

While the above description has been confined to substantially but a single series of telescopic arms, yet obviously, the carrier may be composed of any number of series such as two shown or more where exceptionally long articles in comparison to their width are to be handled, and it is desirable to grip the same at more than two places along its length.

While the invention has been shown and described with particular reference to a machine for handling slabs from a continuous casting machine, yet obviously I do not wish to be limited thereto, but the invention is to be construed broadly and restricted only by the scope of the claims.

I claim:

1. A block handling machine comprising a rotary carrier having radial telescopic arms, a fixed camway, a cam element carried by each arm, the said cam elements riding in the camway to extend and retract said arms and pick-up cups at the ends of said arms, means to create a vacuum within the cups, and a slide valve, movable transversely of said arms to permit the establishment of a vacuum in said cups and to relieve the same.

2. A block handling machine comprising a rotary carrier having two series of spaced apart radial arms, pick-up cups at the ends of said arms, and a slide valve movable transversely of each arm to permit the establishment of a vacuum within the cups and to relieve the same.

3. A block handling machine comprising a rotary carrier having radial tubular arms, pick-up cups carried at the end of said arms, and means to create a vacuum within the cups, a slide valve movable laterally of said arms to permit the establishment of a vacuum in said cups and to relieve the same, a fixed cam, said cam engaging the valve upon rotation of the carrier and causing valve movement thereof in one direction.

4. A block handling machine comprising a rotary carrier having a series of hollow telescopic arms projecting radially from a central hollow hub, each arm hingedly carrying at the end thereof a hollow yoke, pick-up cups connected by each yoke, means to extend and retract the arms, means for producing a vacuum in the hub, arms, yokes and cups, means for relieving the vacuum in a portion of the arms, the yokes and cups, a valve in the arms for making and breaking the vacuum connection between the vacuum producing means and the cups, and means to operate the valve.

5. A block handling machine comprising a rotary carrier having a series of radial telescopic arms carried by a central hub, said hub being rotatably held in a frame, pick-up cups at the ends of the arms, a camway carried by the frame, cam means on the arms and operated in the camway to extend and retract the arms, a cam on the frame, a slide valve movable laterally of the arms to establish and relieve a vacuum in the pick-up cups, said valve having cam means at the end thereof and engageable by the cam, spring means operating against said valve to move the same in one direction, said cam means being operable by the cam to move the valve against the spring and in an opposite direction.

In testimony whereof, I have hereunto subscribed my name this 17th day of February, 1931.

CHARLES G. MORTIMER.